(12) United States Patent
Bala et al.

(10) Patent No.: US 9,304,885 B2
(45) Date of Patent: Apr. 5, 2016

(54) PASSIVE MONITORING OF VIRTUAL SYSTEMS USING AGENT-LESS, NEAR-REAL-TIME INDEXING

(71) Applicant: International Business Machines Corporation, Armonk, NY (US)

(72) Inventors: Vasanth Bala, Rye, NY (US); Canturk Isci, Secaucus, NJ (US); James A. Lindeman, Croton-On-Hudson, NY (US); Todd W. Mummert, Danbury, CT (US); Darrell C. Reimer, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 13/920,288

(22) Filed: Jun. 18, 2013

(65) Prior Publication Data
US 2014/0372596 A1    Dec. 18, 2014

(51) Int. Cl.
*G06F 15/173*    (2006.01)
*G06F 11/30*    (2006.01)

(52) U.S. Cl.
CPC ........ *G06F 11/3003* (2013.01); *G06F 11/3051* (2013.01); *G06F 2201/815* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 6,848,106 B1 | 1/2005 | Hipp | |
| 7,277,999 B1 | 10/2007 | Agesen et al. | |
| 8,621,233 B1 | 12/2013 | Manadhata et al. | |
| 8,806,625 B1 | 8/2014 | Berger | |
| 2003/0158834 A1 | 8/2003 | Sawdon et al. | |
| 2003/0208463 A1* | 11/2003 | Vishlitzky et al. | 707/1 |
| 2004/0044996 A1 | 3/2004 | Atallah | |
| 2006/0225065 A1 | 10/2006 | Chandhok et al. | |
| 2007/0043896 A1 | 2/2007 | Daruwala et al. | |
| 2007/0055710 A1* | 3/2007 | Malkin | 707/202 |
| 2007/0150677 A1 | 6/2007 | Homma et al. | |
| 2008/0028034 A1 | 1/2008 | Currid et al. | |
| 2008/0065597 A1 | 3/2008 | Vedula | |

(Continued)

FOREIGN PATENT DOCUMENTS

| | | | |
|---|---|---|---|
| WO | 2011051025 A1 | 5/2001 | |
| WO | 2010144757 A1 | 12/2010 | |

(Continued)

OTHER PUBLICATIONS

NPL, Logical Volume Manager (LVM2), Red Hat, Sep. 2004.*

(Continued)

*Primary Examiner* — Brendan Higa
*Assistant Examiner* — Padma Mundur
(74) *Attorney, Agent, or Firm* — Mercedes Hobson; Hoffman Warnick LLC

(57) ABSTRACT

Aspects of the present invention provide a solution for passively monitoring a computer system. In an embodiment, a read-only target is created based on the configuration of the virtual server disk used by the virtual server to access the storage associated therewith. This read-only target can be used to expose the virtual server disk for access by a monitoring crawler. Using the read-only target, a monitoring crawler can acquire a set of features regarding the virtual server from the virtual server disk. One or more of this set of features can be analyzed to perform passive monitoring of the virtual server.

19 Claims, 9 Drawing Sheets

(56) References Cited

U.S. PATENT DOCUMENTS

| | | | |
|---|---|---|---|
| 2008/0104217 A1 | 5/2008 | Srinivasa et al. | |
| 2008/0134177 A1 | 6/2008 | Fitzgerald et al. | |
| 2008/0263658 A1* | 10/2008 | Michael et al. | 726/22 |
| 2009/0094428 A1 | 4/2009 | Nagata et al. | |
| 2009/0254990 A1 | 10/2009 | McGee | |
| 2009/0319580 A1 | 12/2009 | Lorenz et al. | |
| 2010/0030983 A1 | 2/2010 | Gupta et al. | |
| 2010/0070725 A1 | 3/2010 | Prahlad et al. | |
| 2010/0107158 A1 | 4/2010 | Chen et al. | |
| 2011/0131183 A1 | 6/2011 | Chandhok et al. | |
| 2011/0161299 A1 | 6/2011 | Prahlad et al. | |
| 2012/0323853 A1 | 12/2012 | Fries et al. | |
| 2013/0111018 A1 | 5/2013 | Ammons et al. | |
| 2014/0165198 A1 | 6/2014 | Altman | |
| 2014/0337594 A1 | 11/2014 | Wade et al. | |
| 2015/0032699 A1 | 1/2015 | Fujita et al. | |

FOREIGN PATENT DOCUMENTS

| | | |
|---|---|---|
| WO | 2012132815 A1 | 10/2012 |
| WO | 2012173831 A2 | 12/2012 |

OTHER PUBLICATIONS

Richardson, Application No. GB1218642.5, Examination Report dated Oct. 15, 2013, 3 pages.
Gene H. Kim, Eugene H. Spafford. "Experiences with Tripwire: Using Integrity Checkers for Intrusion Detection". Purdue Technical Report CSD-TR-94-012. Purdue University Libraries , Feb. 21, 1994: 13 pages, plus two cover pages.
Author unknown. "Osiris User Handbook". Archived Feb 18, 2010. 17 pages Published by The Shmoo Group. Available online: http://web.archive.org/web/2010021811548/http://osiris.shmoo.com/handbook.html.
U.S. Appl. No. 13/527,948, Office Action dated Dec. 31, 2014, (IBMY-0067), 36 pages.
Application No. GB1402601.7, Examination Report Response, Apr. 24, 2014, 15 pages.
Richardson, Application No. GB1218642.5, Combined Search and Examination Report under Sections 17 and 18 (3), Mar. 3, 2013, 6 pages.
Garfinkel et al., "A Virtual Machine Introspection Based Architecture for Intrusion Detection", NDSS 2003, 16 pages.
H. Pomeranz, "Mounting Images Using Alternate Superblocks", http://computer-forensics.sans.org/, Dec. 2008, 4 pages.
Nance et al., "Investigating the Implications of Virtual Machine Introspection for Digital Forensics", IEEE, 2009, 978-0-7695-3564-7/09, pp. 1024-1029.
Fu et al., "Space Traveling across VM: Automatically Bridging the Semantic Gap in Virtual Machine Introspection via Online Kernel Data Redirection", 2012 IEEE Symposium on Security and Privacy, pp. 586-600.
Jiang et al., "Stealthy Malware Detection and Monitoring through VMM-Based "Out-of-the-Box" Semantic View Reconstruction", ACM Transactions on Information and System Security, vol. 13, No. 2, Article 12, Publication date: Feb. 2010, 28 pages.
Srinivasan et al., "Process Out-Grafting: An Efficient "Out-of-VM" Approach for Fine-Grained Process Execution Monitoring", Workshop for Frontiers of Cloud Computing, Dec. 1, 2011, 41 pages.
VM Ware, "Server Consolidation using IBM BladeCenter and VMare Infrastructure", 2005, 12 pages.
Kotsovinos et al., "Virtualization: Blessing or Curse?", ACM Que, vol. 8, No. 11, 2010, 3 pages.
Reimer et al., "Opening Black Boxes: Using Semantic Information to Combat Virtual Machine Image Sprawl", VEE '08, Mar. 5-7, 2008, ACM 978-1-59593-796-4/08/03, pp. 111-120.
"Libguestfs, tools for accessing and modifying virtual machine disk images", http://libguestsfs.org/, 5/21/213, 2 pages.
Mauelshagen et al., "The Linux Logical Volume Manager", Red Hat Magazine, Issue #9, Jul. 2005, 13 pages.
Paranjape, "Right to Your own Devices", Linux Gazzette #114, May 2005, 9 pages.
Gilly et al., "Recent Developments in Patent Enforcement in the Cloud," Nov. 2011, pp. 1-6, BNA's Patent, Trademark & Copyright Journal.
U.S. Appl. No. 13/527,994, Office Action dated May 7, 2015, (IBMY-0066), 46 pgs.
U.S. Appl. No. 13/968,722, Notice of Allowance dated Aug. 14, 2015, (IBMY-0076), 23 pages.
U.S. Appl. No. 13/527,948, Final Office Action 1 dated Aug. 31, 2015, (IBMY-0067), 36 pgs.
U.S. Appl. No. 13/527,994, Notice of Allowance dated Aug. 25, 2015, (IBMY-0066), 20 pgs.

* cited by examiner

Figure 4

| Virtual Block | 22 | 85 | 30 | 16 | 53 | 25 |
|---|---|---|---|---|---|---|
| Target Block | 75 | 27 | 81 | 46 | 34 | 39 |
| Write Indicator | Yes | No | No | No | Yes | No |

PASSIVE MONITORING OF VIRTUAL SYSTEMS USING AGENT-LESS, NEAR-REAL-TIME INDEXING

TECHNICAL FIELD

The subject matter of this invention relates generally to computer systems management. More specifically, aspects of the present invention provide a solution for improved passive monitoring in a complex virtual environment.

BACKGROUND

In the electronic environment of today, computer systems undergo constant changes. In order to keep up with these changes, it is important that users of these systems be able to monitor the systems. Monitoring can be classified into several different types, including active monitoring and passive monitoring. Passive monitoring includes any observation that does not modify a computer system. To this extent, passive monitoring can include scanning a file system to perform a compliance check, scanning a registry to determine which applications are currently installed on the system, security scanning, file system inspection, license usage monitoring, and the like. In contrast, activities, such as patching, applying a security update, etc., that involve modification of the computer system are referred to as active monitoring.

In a standard computer system, passive monitoring often includes running one or more programs (e.g., agents) in the background of the system to perform passive monitoring functions. These programs can provide functions that include, but are not limited to: system monitoring, compliance checking, security, malware detection, software discovery, drift detection, backups, and/or the like. This in-system approach solution becomes less practical in computer systems, such as virtual server type computer systems, in which a large number of instances are executed on the same physical machine. Such systems allow more efficient use of underlying physical resources and more simplified management of running systems by allowing the runtime system state to be decoupled from the physical hardware. Further, increased ease in creating, deployment and recycling of virtual servers has led to greater numbers of virtual servers running simultaneously and/or consecutively on the same physical machine.

SUMMARY

In general, aspects of the present invention provide a solution for passively monitoring a computer system. In an embodiment, a read-only target is created based on the configuration of the virtual server disk used by the virtual server to access the storage associated therewith. This read-only target can be used to expose the virtual server disk for access by a monitoring crawler. Using the read-only target, a monitoring crawler can acquire a set of features regarding the virtual server from the virtual server disk. One or more of this set of features can be analyzed to perform passive monitoring of the virtual server.

A first aspect of the invention provides a method for passively monitoring a virtual server, comprising: creating a read-only disk target based on a configuration of a virtual server disk associated with the virtual server; exposing the virtual server disk to be accessed by the read-only target; acquiring, by a monitoring crawler, a set of features regarding the virtual server from the virtual server disk via the read-only target; and analyzing at least one of the set of features to perform passive monitoring of the virtual server.

A second aspect of the invention provides a system for passively monitoring a computer system, comprising at least one computer device that performs a method, comprising: creating a read-only target based on a configuration of a virtual server disk associated with the virtual server; exposing the virtual server disk to be accessed by the read-only target; acquiring, by a passive monitoring crawler, a set of features regarding the virtual server from the virtual server disk via the read-only target; and analyzing at least one of the set of features to perform passive monitoring of the virtual server.

A third aspect of the invention provides a computer program product embodied in a computer readable medium for implementing a method for passively monitoring a computer system, the method comprising: creating a read-only target based on a configuration of a virtual server disk associated with the virtual server; exposing the virtual server disk to be accessed by the read-only target; acquiring, by a passive monitoring crawler, a set of features regarding the virtual server from the virtual server disk via the read-only target; and analyzing at least one of the set of features to perform passive monitoring of the virtual server.

A fourth aspect of the present invention provides a method for deploying an application for passively monitoring a computer system, comprising: providing a computer infrastructure being operable to: create a read-only target based on a configuration of a virtual server disk associated with the virtual server; expose the virtual server disk to be accessed by the read-only target; acquire, by a passive monitoring crawler, a set of features regarding the virtual server from the virtual server disk via the read-only target; and analyze at least one of the set of features to perform passive monitoring of the virtual server.

Still yet, any of the components of the present invention could be deployed, managed, serviced, etc., by a service provider who offers to implement passive monitoring in a computer system.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which:

FIG. 4 shows an example device mapper table according to embodiments of the invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

The inventors of the present invention have discovered that the current way of passively monitoring a virtual server can be improved. For example, the current solution of adding a passive monitoring agent to each virtual server expands the "footprint" of every virtual server within the virtualized datacenter environment. Although this expanded footprint may be small in absolute terms for a single virtual server, it can become significant in a system, such as a virtualized datacenter environment in which there are a very large number of virtual servers competing for resources on a single physical server. In addition, the inventors of the present invention have discovered that snapshot-based solutions have limitations as well. For example, many snapshot-based solutions require that an image be taken of the entire system. In cases in which only a small subset of the information regarding the virtual server needs to be analyzed, these snapshots will contain unnecessary information which will require time to prepare and space to store that could be better employed elsewhere. Further, such snapshot-based solutions may only capture the state of the system at a single point in time. This can limit the amount of analysis that can be done and/or require the taking of multiple snapshots to perform the necessary analysis.

Further, the inventors of the present invention have discovered that it can be valuable that such monitoring cause no side effects. That is, monitoring itself should not cause any changes in the state or operation of the monitored system. Further, the inventors have discovered that it can be challenging with current out-of-system monitoring solutions to reliably access the "dirty" disk state of running systems. For example, as systems run, they can continuously change, i.e., dirty, their data on disk. Current standard disk access methods that expect a clean, quiescent disk often fail when applied to the active disks of running systems.

As indicated above, aspects of the present invention provide a solution for passively monitoring a computer system. In an embodiment, a read-only target is created based on the configuration of the virtual server disk used by the virtual server to access the storage associated therewith. This read-only target can be used to expose the virtual server disk for access by a monitoring crawler. Using the read-only target, a monitoring crawler can acquire a set of features regarding the virtual server from the storage block. One or more of this set of features can be analyzed to perform passive monitoring of the virtual server.

Figure 1:
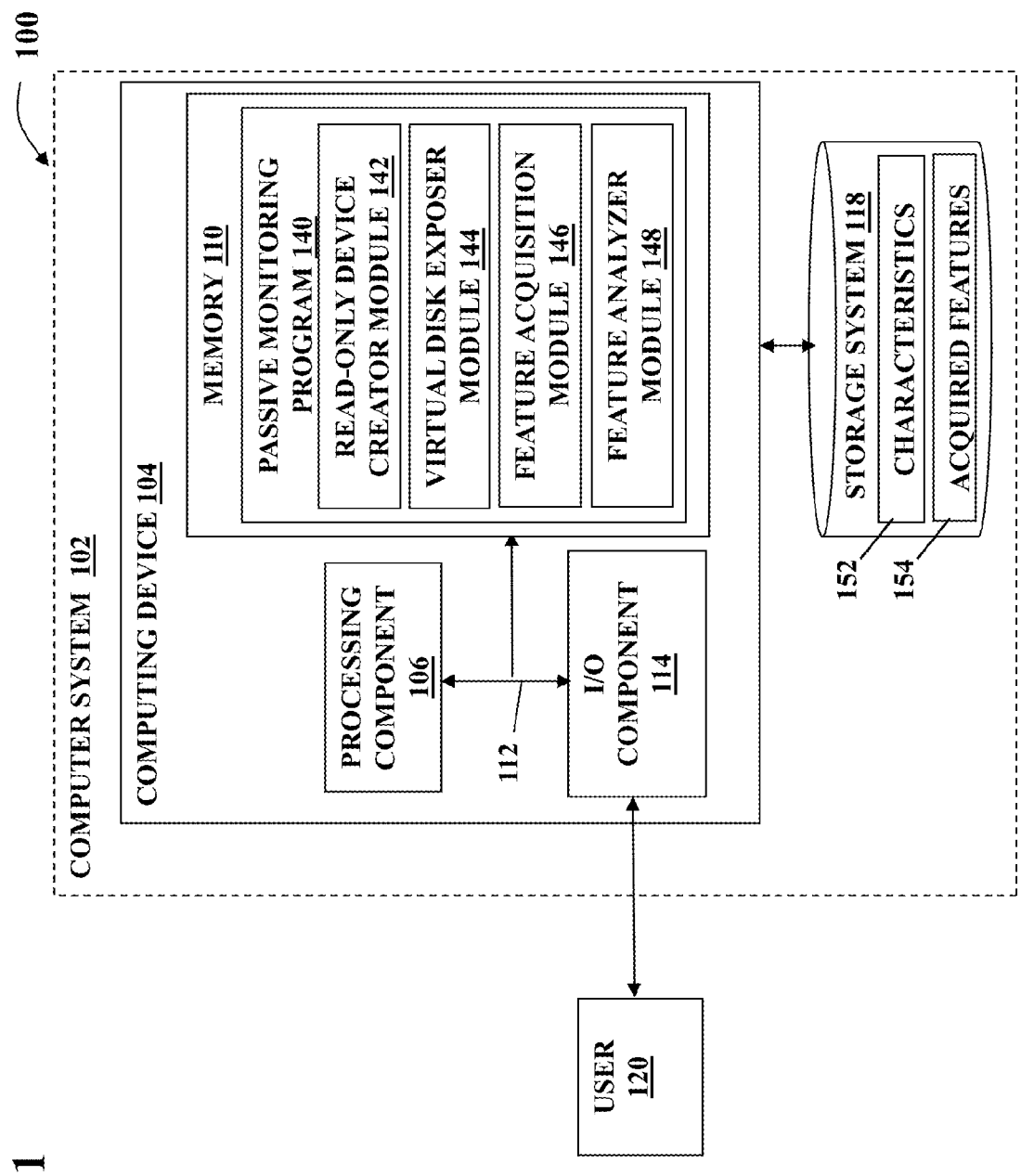
FIG. 1 shows an illustrative computer system according to embodiments of the present invention.

Turning to the drawings, FIG. 1 shows an illustrative environment 100 for passively monitoring a computer system. To this extent, environment 100 includes a computer system 102 that can perform a process described herein in order to passively monitor a computer system. In particular, computer system 102 is shown including a computing device 104 that includes a passive monitoring program 140, which makes computing device 104 operable to passively monitor a computer system by performing a process described herein.

Computing device 104 is shown including a processing component 106 (e.g., one or more processors), a memory 110, a storage system 118 (e.g., a storage hierarchy), an input/output (I/O) interface component 114 (e.g., one or more I/O interfaces and/or devices), and a communications pathway 112. In general, processing component 106 executes program code, such as passive monitoring program 140, which is at least partially fixed in memory 110. To this extent, processing component 106 may comprise a single processing unit, or be distributed across one or more processing units in one or more locations.

Memory 110 also can include local memory, employed during actual execution of the program code, bulk storage (storage system 118), and/or cache memories (not shown) which provide temporary storage of at least some program code in order to reduce the number of times code must be retrieved from bulk storage system 118 during execution. As such, memory 110 may comprise any known type of temporary or permanent data storage media, including magnetic media, optical media, random access memory (RAM), read-only memory (ROM), a data cache, a data object, etc. Moreover, similar to processing component 116, memory 110 may reside at a single physical location, comprising one or more types of data storage, or be distributed across a plurality of physical systems in various forms.

While executing program code, processing component 106 can process data, which can result in reading and/or writing transformed data from/to memory 110 and/or I/O component 114 for further processing. Pathway 112 provides a direct or indirect communications link between each of the components in computer system 102. I/O component 114 can comprise one or more human I/O devices, which enable a human user 120 to interact with computer system 102 and/or one or more communications devices to enable a system user 120 to communicate with computer system 102 using any type of communications link.

To this extent, passive monitoring program 140 can manage a set of interfaces (e.g., graphical user interface(s), application program interface, and/or the like) that enable human and/or system users 120 to interact with passive monitoring program 140. Users 120 could include system administrators and/or clients utilizing resources in a virtual data center environment 200 (FIG. 2), among others. Further, passive monitoring program 140 can manage (e.g., store, retrieve, create, manipulate, organize, present, etc.) the data in storage system 118, including, but not limited to a characteristics 152 and/or acquired features 154, using any solution.

In any event, computer system 102 can comprise one or more computing devices 104 (e.g., general purpose computing articles of manufacture) capable of executing program code, such as passive monitoring program 140, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, passive monitoring program 140 can be embodied as any combination of system software and/or application software. In any event, the technical effect of computer system 102 is to provide processing instructions to computing device 104 in order to passively monitor a computer system.

Further, passive monitoring program 140 can be implemented using a set of modules 142-148. In this case, a module 142-148 can enable computer system 102 to perform a set of tasks used by passive monitoring program 140, and can be separately developed and/or implemented apart from other portions of passive monitoring program 140. As used herein, the term "component" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing component 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104, each computing device 104 can have only a portion of passive monitoring program 140 fixed thereon (e.g., one or more modules 142-148). However, it is understood that computer system 102 and passive monitoring program 140 are only representative of various possible equivalent computer systems that may perform a process described herein. To this extent, in other embodiments, the functionality provided by computer system 102 and passive monitoring program 140 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, passive monitoring program 140 enables computer system 102 to passively monitor a computer system. To this extent, passive monitoring program 140 is shown including a read-only device creator module 142, a virtual disk exposer module 144, a feature acquisition module 146, and a feature analyzer module 148.

Figure 2:
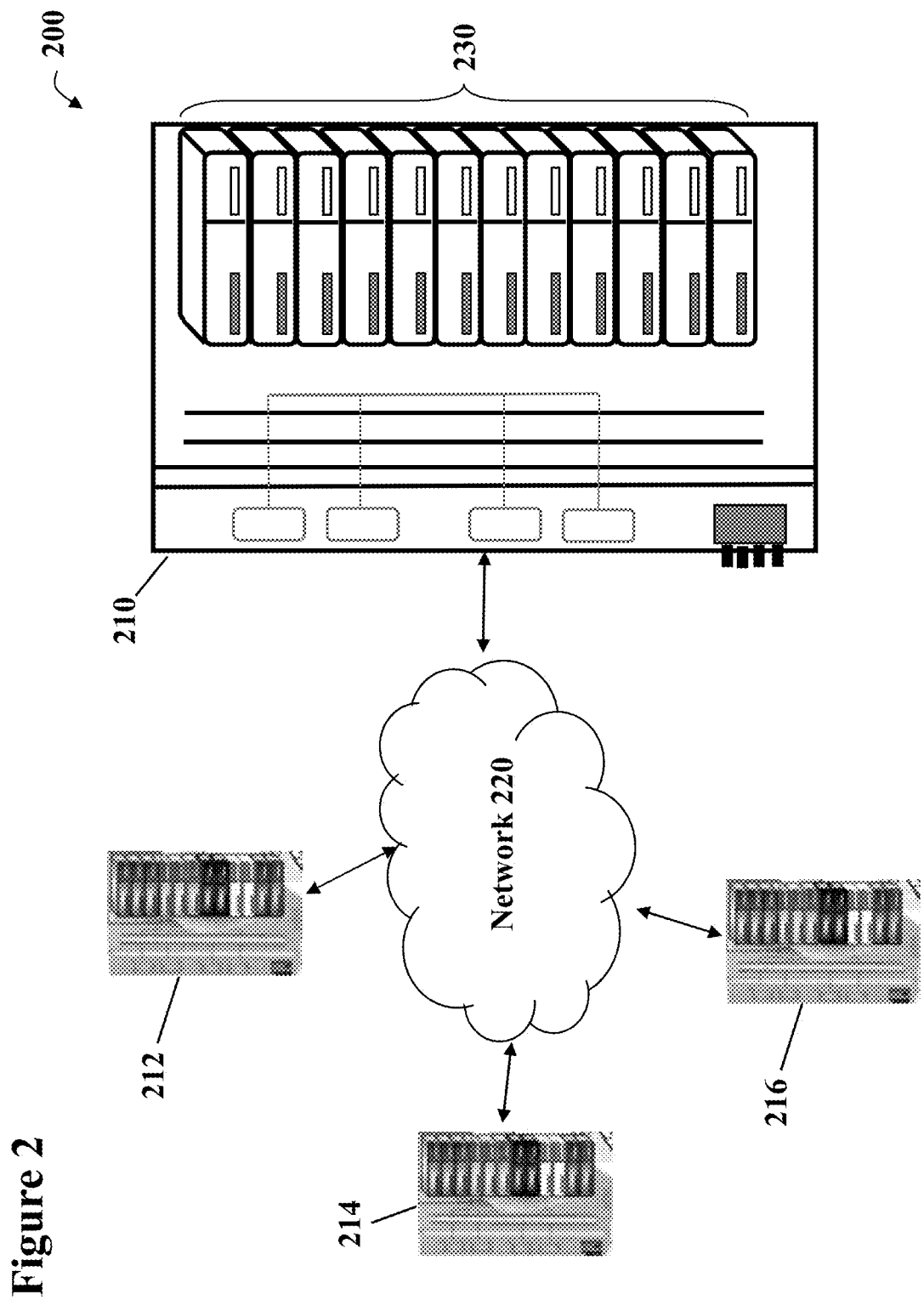
FIG. 2 shows a virtualized datacenter environment according to embodiments of the invention.

Referring now to FIG. 2, a virtualized datacenter environment 200 according to embodiments of the invention is shown. As shown, virtual datacenter environment 200 has a physical server 210 that can be used to perform all or a portion of the functions of passive monitoring program 140 (FIG. 1). To this extent, physical server 210 can be a server from any manufacturer that runs any platform that is adapted to run multiple instances of a virtual server 230. As illustrated in FIG. 2, virtualized datacenter environment 200 can also contain any number of related physical servers 212, 214, 216. Related physical servers 212, 214, 216 can be connected with physical server 210 for communication purposes via a network 220. Network 220 can allow physical server 210 to communicate with related physical servers 212, 214, 216 and/or physical servers 212, 214, 216 to communicate with one another using any communications solution or solutions now known or later developed. In some embodiments, network 220 can operate on a cloud computing scale, providing, e.g., computation, software, data access, and other services that do not require end-user knowledge of the physical location and configuration of the network 220 that delivers the services.

In any case, as stated above, each instance of virtual server 230 on physical server 210 can operate simultaneously with other virtual server instances 230 while maintaining independence. This means that each of the instances of virtual server 230 operates independently of other instances of virtual server 230 and does not share information with other instances of virtual server 230 even though the instances of virtual server 230 operate on the same physical server 210. Owing to the characteristics of these instances of virtual server 230, a single physical server 210 can execute a very large number of instances of virtual server 230 concurrently. The independent operation of these instances of virtual server 230 ensures that the number of concurrent instances of virtual server 230 is only limited by the hardware constraints of physical server 210.

Figure 3:
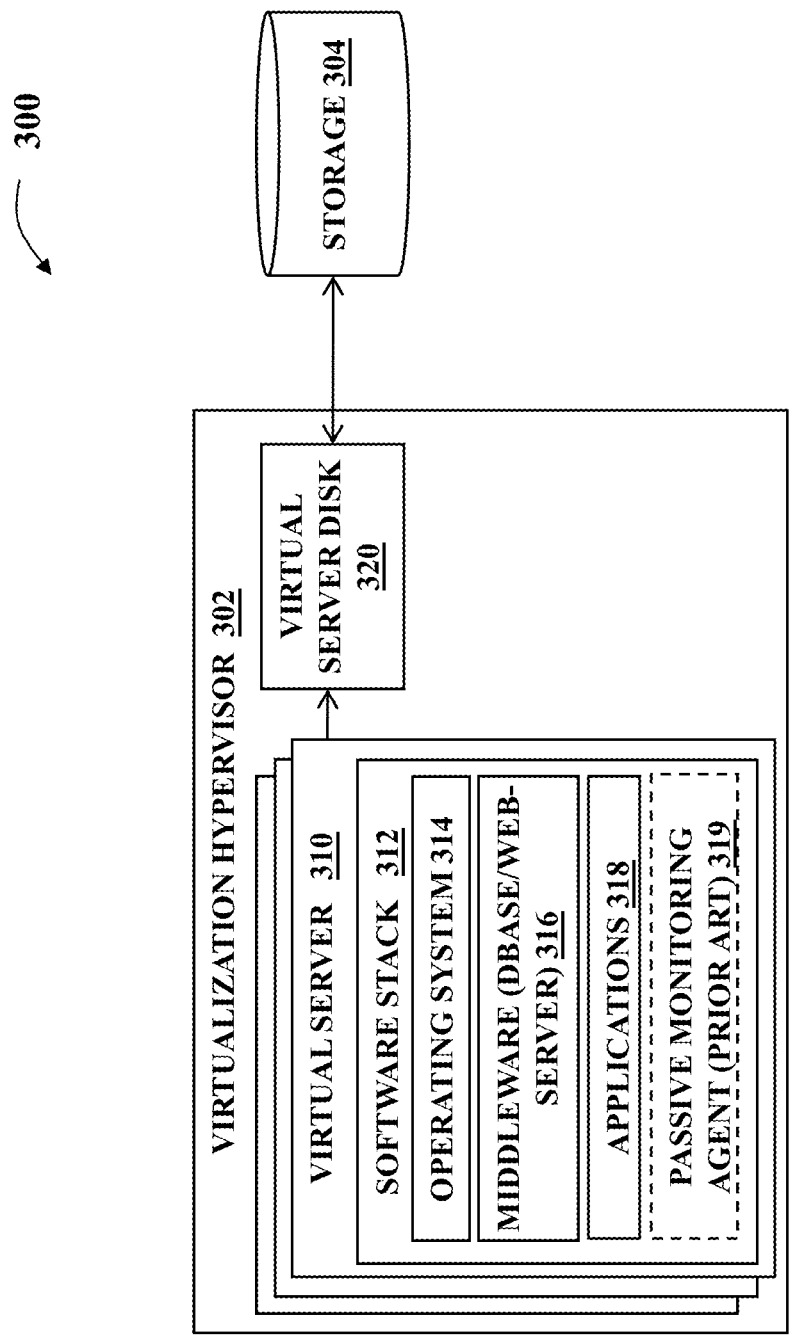
FIG. 3 shows an example virtual server according to embodiments of the invention.

Turning now to FIG. 3, an example virtual server environment 300 according to embodiments of the invention is shown. It should be understood that virtual server environment 300 is different from a process virtual machine. A process virtual machine is a platform dependent engine, such as a Java Virtual Machine, that executes platform independent code written in a high-level programming language, such as Java, for performing a specific task (Java and Java Virtual Machine are a trademark of Sun Microsystems in the United States and/or elsewhere). In contrast, the virtual server environment 300 of the current invention is a virtual system that simulates an entire computing environment. To this extent, rather than performing only a single task, the virtual server environment 300 of the current invention is an environment within which a variety of tasks, functions, operations, etc., can be carried out by a user 120 (FIG. 1). As such, virtual server environment 300 can be made to simulate a standalone computer system in the eyes of a user 120 (FIG. 1).

To this extent, virtual server environment 300 includes a virtualization hypervisor 302 at the lowest level. Specifically, virtualization hypervisor 302 provides a platform that allows multiple "guest" virtual server 310 systems to run concurrently on the physical server 210 (FIG. 2). To this extent, virtualization hypervisor 302 provides an abstraction level between the hardware level of physical server 210 (FIG. 2) and the higher level software functions of each virtual server 310. In order to provide these software functions, each virtual server 310 can include a software stack 312, which can also be referred to as an image. Software stack 312 contains everything that is necessary to simulate a "guest" instance of a particular virtual server 310 on physical server 210 via virtualization hypervisor 302. To this extent, software stack 312 can provide an operating system 314, middleware 316, and one or more applications 318.

In order to decrease maintenance costs by limiting the number of different variations of systems running in virtualized datacenter environment 200, standardization can be employed at this level. For example, a specific software stack 312 can be generated from one of a limited number of pre-configured stacks. These pre-configured stacks can be optimized for their particular function by providers of virtualized datacenter environment 200 (FIG. 2). As such, if a user 120 (FIG. 1) wants to utilize database functionality, one or more virtual servers 310 having the same software stack 312 based on the same preconfigured stack can be generated specifically for this user 120. These software stacks 312 could, for example, contain an operating system 314 of a type that is appropriate for performing database functions, middleware 316 that contains a database management system, and applications 318 that are configured to run against the database management system. Similarly, if a user 120 (FIG. 1) wants to utilize web server functionality, one or more virtual servers 310 having the same software stack 312 based on a different preconfigured stack from the preconfigured stack used for the database management system can be generated specifically for that user 120. These software stacks 312 could, for example, contain operating system 314 of a type that is appropriate for web server functions, middleware 316 that contains a web server management system, and applications 318 that are configured to run against the web server management system. It should be understood that software stacks 312 that are adapted to perform various other functions within virtualized datacenter environment could be generated as well. To this extent, operating system 314 can include any operating system now known or later developed. Further, middleware 316 and applications 318 can include any solutions that can be envisioned for providing the desired functionality for a particular virtual server 310.

However, ensuring that virtual servers 310 are created using standardized preconfigured stacks does not guarantee that a particular instance of virtual server 310 will remain within acceptable parameters once a user 120 (FIG. 1) begins utilizing it. For example, one user 120 may make an inadvertent change to a software stack 312 that makes the corresponding virtual server 310 non-compliant. Alternatively, a user 120 may make an intentional change to a software stack 312 without knowledge that the change has made the software stack 312 non-compliant. Still further, a non-compliant change can be introduced maliciously, such as from malware that has been inadvertently loaded onto virtual server 310 by user 120. In any case, such non-compliant changes in the software stack 312 of a particular instance of virtual server 310 can cause virtual server 310 to function inefficiently or incorrectly. Because, the physical space utilized by virtual server 310 is utilized also by other virtual servers 310 (FIG. 2) as well, changes of this sort can cause an immediate or gradual degradation of virtualized datacenter environment 200 system functions.

As stated previously, to counteract this problem, solutions have been proposed for passively monitoring a virtual server 310 to detect deviation in the virtual server 310 deriving from such non-compliant changes. FIG. 3 illustrates one such prior art solution in which a passive monitoring agent 319 is installed in every instance of virtual server 310 in the virtualized datacenter environment 200. However, the inventors of the present application have discovered some shortcomings of this approach. For example, as shown in FIG. 3 the addition of passive monitoring agent 319 to virtual server 310 uses resources, expanding the "footprint" of virtual server 310 within virtualized datacenter environment 200. Although this expanded footprint may be small in absolute terms for a single virtual server 310, it can become significant in a system, such as virtualized datacenter environment 200 in which a very large number of virtual servers 310, each of which has its own passive monitoring agent 319, are competing for resources on physical server 210. In addition, the inventors of the present invention have discovered that if each passive monitoring agent 319 is required to report to a central detection server (not shown) the combined output from the reporting passive monitoring agents 319 can constrict, if not overwhelm, communications across network 220 (FIG. 2). Still further, because of the rapidly evolving nature of threats due to malware, passive monitoring agent 319 may need to be updated frequently. The large number of passive monitoring agents 319 in the virtual servers 310 in virtualized datacenter environment 200 can require significant resources for locating, checking the status of the virtual servers 310 and updating the passive monitoring agents 319, if necessary.

In any event, in order to perform the task or tasks that are requested of it, virtual server environment 300 may have to perform one or more writes to a storage location 304. Storage location 304 can include one or more virtual disks that are included within the virtual server 310. In this case, storage location could be included within a file system of the virtualization hypervisor 302. Additionally or in the alternative, storage location 304 could also include one or more of a device, a pseudo device (e.g., a loop over file and/or dev mapper device) and/or the like. In any event, storage location 304 is visible by and through visualization hypervisor 302 and is therefore accessible from outside the virtual server environment 300. Whatever the case, because virtual server 310 is, in essence, software that is being executed by the underlying physical server 210 (FIG. 2) via virtualization hypervisor 302, any changes to software stack 312, such as via operating system 314, middleware 316 and/or applications 318, may require a write operation that communicates the changes to storage 304. To facilitate these operations, the virtualization hypervisor 302 can provide a virtual server disk 320. Virtual server disk 320 acts as an interface (e.g., a driver) between the virtual server environment 300 and storage 304 which can be located on the underlying physical server 210 (FIG. 2) and/or on a separate node. To this extent, virtual server disk 320 provides the services of the underlying physical storage 304 device to the virtual server environment 300. Virtual server disk 320 may also map a set of data blocks used internally by the virtual server 310 with a set of target data blocks in storage 304, such as using a device mapper table. In such cases, an image file of the virtual server 310 can be wrapped in a linear device mapper block to create device mapper table over the image file of virtual server 310.

Turning now to FIG. 4, a device mapper table 322 according to embodiments of the invention is shown. In an embodiment, device mapper table 322 can be a dedicated device (or driver) and/or can be created over the image file of the virtual server (FIG. 3), such as by wrapping the image file of the virtual server in a linear block device, defined by the device mapper table, for a virtual server 310 (FIG. 3). In any event, device mapper table 322, can facilitate read and/or write operations between a particular virtual server 310 (FIG. 3) and storage 304 (FIG. 3) on the underlying physical server 210 (FIG. 2). Device mapper table 322 does this by mapping disk block addresses used by the virtual server 310 (FIG. 3) to target addresses utilized by storage 304 (FIG. 3). To facilitate this function, device mapper table 322 can include a virtual block 324 and a target block 326. When the virtual server 310 (FIG. 3) reads from or writes to storage 304 (FIG. 3), virtual server 310 (FIG. 3) can submit a request that includes virtual block 324 (e.g., 22). Device mapper table 322 can use the virtual block 324 map the request to the correct target block 326 in storage 304 (FIG. 3), in this case block 75. Device mapper table 322 can also include a write indicator 328. Write indicator 328 indicates whether a write to a particular target block 326 in storage 304 (FIG. 3) has occurred. Write indicator 328 can perform this task using any solution now known or later developed, including, but not limited to a data bit, a toggle, a counter, a set of data values associated with each condition, and/or the like.

Figure 5:
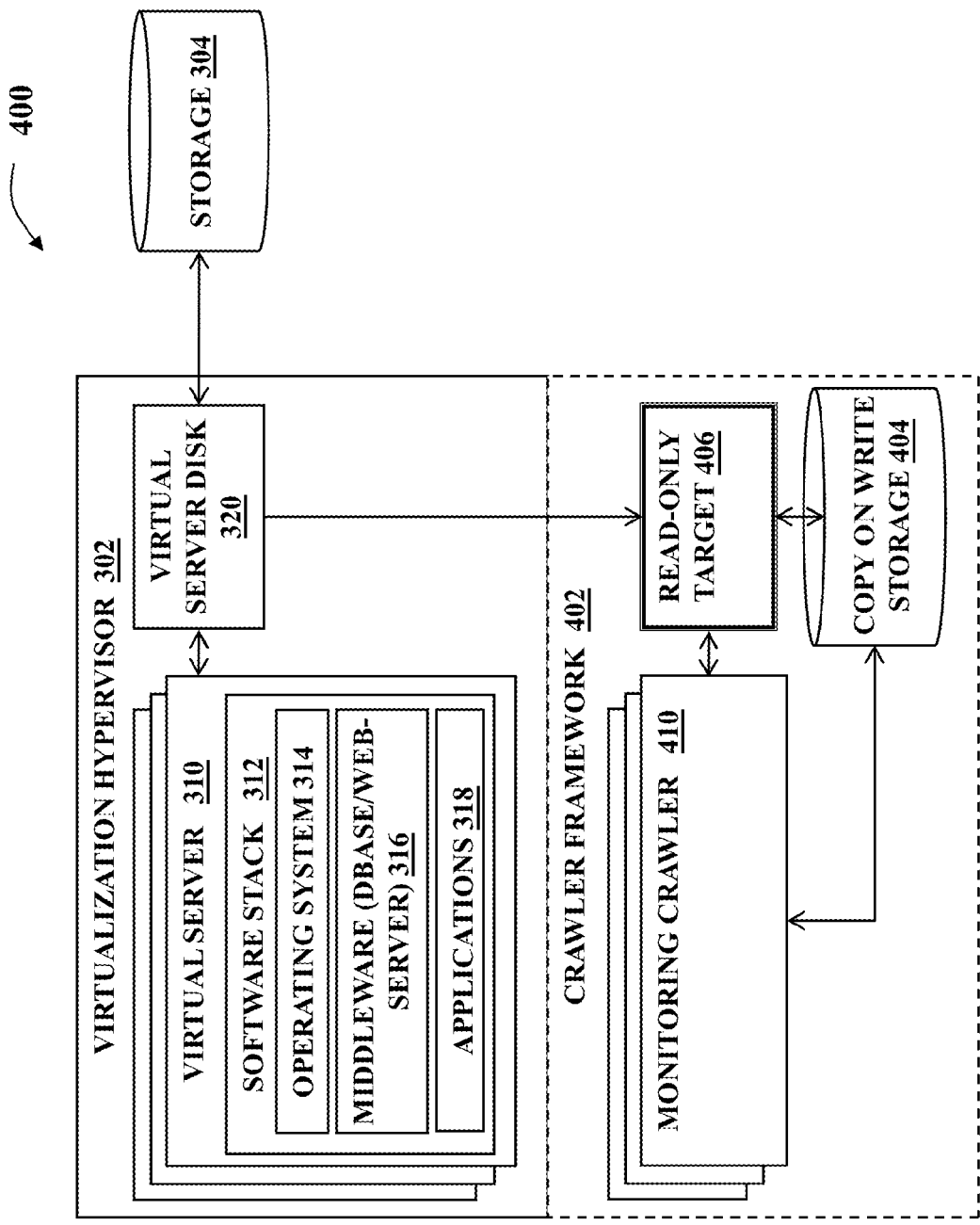
FIG. 5 shows an improved virtual server environment according to embodiments of the invention.

Turning now to FIG. 5, an improved virtual server environment 400 according to embodiments of the invention is shown. As illustrated, improved virtual server environment 400 includes a crawler framework 402, which can be used to carry out one or more of the functions of the invention. Crawler framework 402 could include a monitoring crawler 410, which will be described in further detail hereafter. As indicated by the dashed box surrounding crawler framework 402, crawler framework 402 could be a part of the same virtualization hypervisor 302 within which virtual server 310 is contained. Alternatively, crawler framework 402 could be included within a different virtualization hypervisor on the same physical server 210 (FIG. 2). In these cases, monitoring crawler 410 could be included within a virtual server located on the respective virtualization hypervisor. Additionally, or in the alternative, one or more elements of crawler framework 402 could be located on the same physical server 210 (FIG. 2) but implemented using a non-hypervisor-based solution. Additionally, or in the alternative, one or more elements of crawler framework 402 could be located remotely from the physical server 210 (FIG. 2) upon which virtual server 310 is located, such as a central server that is permanently or temporarily networked with the physical server 210 (FIG. 2).

Turning now to FIGS. 1 and 5, concurrently, read-only device creator module 142, as executed by computer system 102, can create a read-only target device 420. This read-only target 406 can be created based on the configuration of virtual server disk 320 used by virtual server 310 to access the storage location 304 with which virtual server 310 is associated. For example, in certain embodiments, a virtualization management utility that is included in virtualization hypervisor 302 can analyze the virtual server 310 to identify the configurations of one or more of the devices associated therewith. From this analysis, the configuration of the virtual server disk 320 can be determined. This configuration, in turn, can be used to create a read-only target 406 that has all or substantially all of the characteristics of the virtual server disk 320. One important difference is that read-only target 406 is, itself, read-only.

Figure 6A:
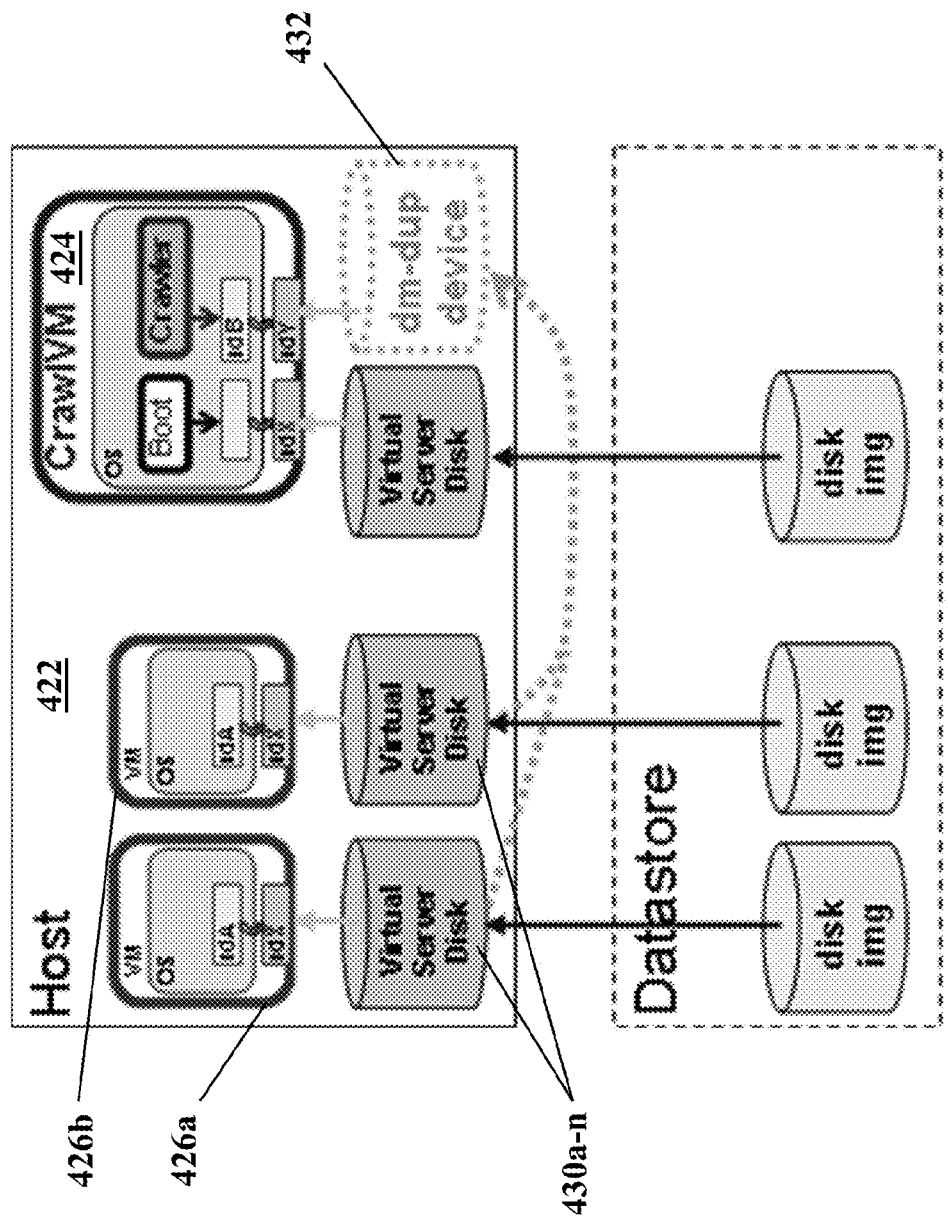
FIGS. 6A-B show strategies for crawling a virtual server environment according to embodiments of the invention.

In any event, read-only target 406 can take on one of several forms, depending on the configuration of crawler framework 410. Turning now to FIG. 6A in conjunction with FIG. 5, an embodiment 420 in which a crawlVM 424 (e.g., crawler framework 410) is located on the same host 422 (e.g., physical server 210 (FIG. 2)) as virtual server or servers 426*a,b* (e.g., virtual server 310) that the crawlVM 424 will be monitoring is shown. In such an environment 420, read-only target 406 can be embodied in the form of a duplicate device mapper (DM-dup) device 432. DM-dup device 432 can be thought of as a pseudo device that has the same device table as the actual device mapper device (dm device) 430*a-n* (e.g., virtual server disk 320). DM-dup device 432 can be created by host 422 and/or by monitoring crawler 410 executing as a virtual machine within host 422. For example, in a Linux environment, host 422 and/or monitoring crawler 410 can generate DM-dup device 432 using standard Linux block device mapping logic. In any event, DM-dup device 432 is created, as read-only, thus not allowing any side effects on the virtual server disk 320, even at the block level. When, as shown, a separate crawlVM 424 is used, DM-dup device 432 can be propagated into crawlVM 424 as a separate device. This pseudo dup-device 424 can initially be tableless, meaning there is no backing device for the VM's 426*a,b* virtual device. However, during runtime, this device can be loaded with any of the DM devices 430*a-n* by replacing its current device mapper table with the corresponding DM device 430*a-n* mapping. This way, the same DM-dup device 432 can be used to map, mount, and/or crawl/index any of the VMs 426*a,b* that are located on the same host 422.

Figure 6B:
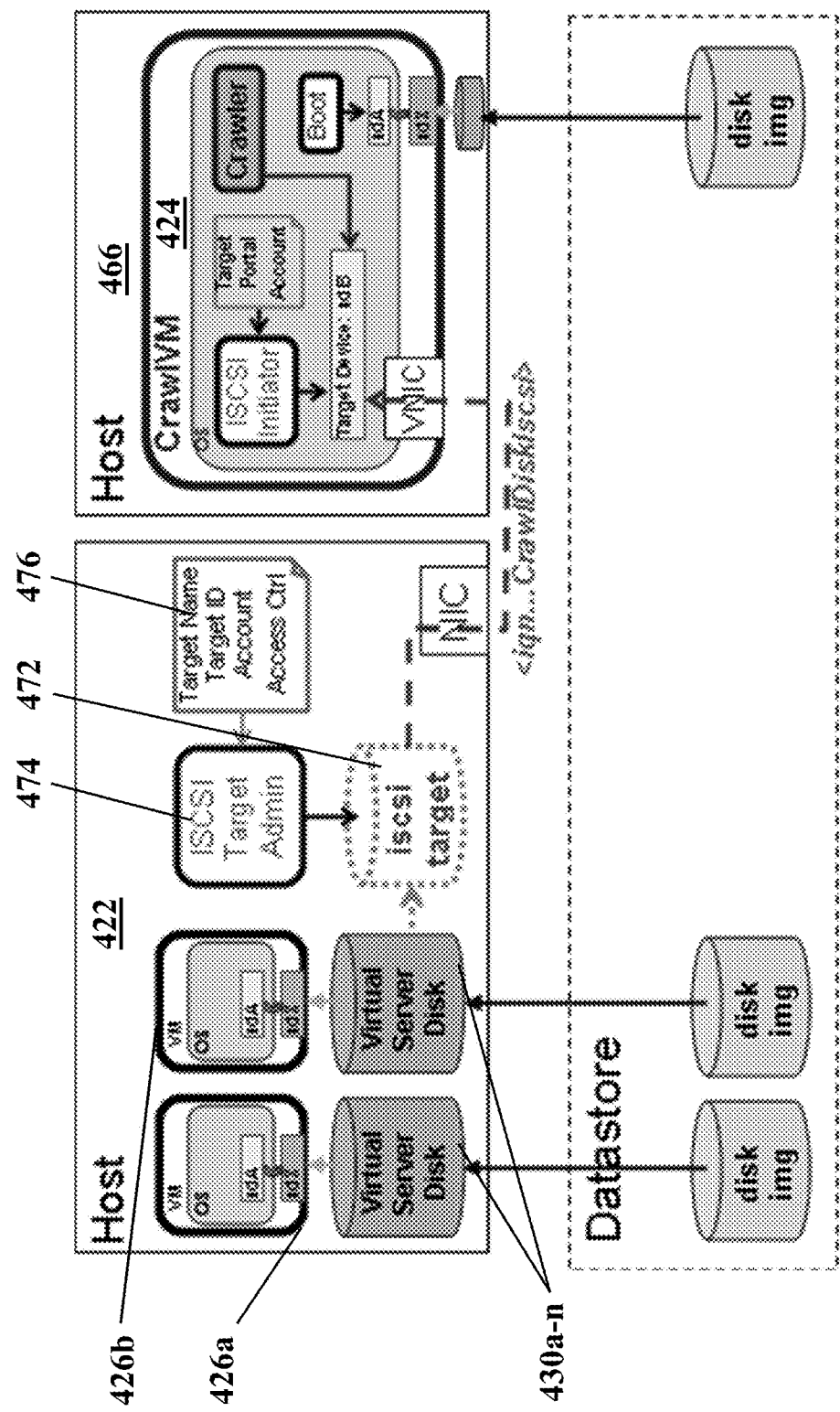

Turning now to FIG. 6B in conjunction with FIG. 5, another embodiment in which crawlVM 424 (e.g., crawler framework 410) is located on a remote host 466 (e.g., physical server 212, 214, 216 (FIG. 2)) from the host 422 on which the virtual machine (VM) 426*a, b* resides is shown. In such an environment 460, read-only target 406 can be embodied in the form of an iSCSi target 472. ISCSi target 472 can be used to expose the target block device 430*a-n* to the remote host 466 over a network. This can enable all or a part of crawlVM 424 (e.g., monitoring crawler 410) to be completely decoupled from the target VM(s) 426*a,b*, while allowing access to block device 430*a-n* (e.g., virtual server disk 320) over the network via an initiator on the crawl side. To insure security, an iSCSi target administrator 474 can be used to perform authentication functions on the host 422. ISCSi target administrator 474 can perform this authentication using a set of credentials 476 (e.g., virtual server 310 to be monitored, access control information, etc.). When a particular VM 426*a,b* is to be monitored, monitoring crawler 410 can send the correct credentials 476, such as over a network 220 (FIG. 2) as well a specification of the VM(s) 426*a,b* to be monitored. In the illustrated iSCSI-specific implementation, credentials can be managed via CHAP authentication and/or additional access control configurations limiting access to specific crawlVM 424 instances. It should be understood, however, that other platforms and/or solutions for exposing a VM 426*a,b* to an external host 466 over a network are within the scope of the invention. In any case, the exposing creates a link to VM(s) 426*a,b* that allows access to block device(s) 430*a-n* over the network on a read-only basis.

Referring again to FIGS. 1 and 5, concurrently, virtual disk exposer module 144, as executed by computer system 102, associates read-only target 406 with the storage 304 associated with a particular virtual server 310. This associating can occur using the mapping solutions described above or utilizing any solution that is now known or later developed. For example, in certain embodiments, a single read-only target 406 may by created each time a request is made to perform passive monitoring on a particular virtual server 310 and destroyed upon completion of the request. Alternatively, in other embodiments, a read-only target 406 may not be destroyed after use, but rather kept for reuse. In such embodiments, read-only target 406 can be disassociated from a virtual server disk 320 (e.g., disk device 430*n* corresponding to VM 426*b* in FIGS. 6A and 6B) with which it had been associated for access by monitoring crawler 410 and associated with a new virtual server disk 320 (e.g., disk device 430*a* corresponding to VM 426*a* in FIGS. 6A and 6B) for which passive monitoring is now desired. This can be accomplished by copying device mapper table 322 associated with the new virtual server 310 to read-only target 406 in such a way that the information that was previously held in read-only target 406 is replaced by the copied information from device mapper table 322. Alternatively, this can be accomplished by removing an existing ISCSI connection from a virtual server disk 320 (e.g., disk device 430*n* corresponding to VM 426*b* in FIG. 6B), and replacing it with a read-only connection to a new virtual server disk 320 (e.g., disk device 430*a* corresponding to VM 426*a* in FIG. 6B). Alternatively, in still other embodiments, a single read-only target 406 could be associated with multiple virtual server disks 320, concurrently. In such an embodiment, for each new virtual server disk 320 that association is sought, a copy of device mapper table 322 associated with the particular virtual server disk 320 could be copied from virtual server disk 320 to read-only target 406 without removing like information regarding other virtual servers 310. Alternatively, for each new virtual server disk 320 that association is sought, a new logical unit number (LUN) could be added to an existing ISCSI-based read-only target 406 without removing the like information regarding other virtual servers 310. Such information could be disposed of when not needed or kept within read-only target 406 until such time as future access is desired.

Referring still to FIGS. 1 and 5, concurrently, feature acquisition module 146, as executed by computer system 102, can acquire a set of features regarding virtual server 310 from the associated virtual server disk 320. This acquisition of virtual server 310 features can be performed by monitoring crawler 410 through the use of read-only target 406. Because read-only target 406 is directly associated with the virtual server disk 320 that corresponds to the virtual server 310 for which passive monitoring is desired, monitoring crawler 410 can use read-only target 406 to access only those features of virtual machine 310 for which information is desired.

In consequence, unlike the taking of a snapshot, which copies the entire state of the virtual server 310 at a certain point in time, monitoring crawler 410 can acquire any set of features from virtual server 310, ranging from a "full crawl", which involves an entire sweep of the virtual server disk 320 of virtual server 310 to "targeted crawl", which crawls only a defined subset of the virtual server disk 320 of virtual server 310. Using such a "targeted crawl", as little as a single block of information from virtual server disk 320 can be targeted for acquisition. Further, due to the persistent nature of the association between read-only target 406 and virtual server disk 320, monitoring crawler 410 is also able to acquire the set of features in such a manner as to be able to perform an "incremental crawl." In such an "incremental crawl", monitoring crawler 410 can utilize read-only target 406 to crawl all or a portion of the virtual server disk 320 over time. The time period for such a crawl can be pre-defined, based on a pre-determined amount of data to be acquired, based on any differentials observed with respect to preceding crawls of the same image or instance, and/or the like.

In any case, the utilization by monitoring crawler 410 of a target that is read-only (e.g., the monitoring crawler itself cannot perform any writes that can affect the state of the actual virtual disk 320) insures that no changes are or can be made to the state of the virtual server disk 320. In contrast, attempts to access storage 304 through the virtual server's 310 virtual server disk 320 while the virtual server 310 has live access to storage 304 are likely to not succeed directly, even if performed as a read-only operation. This is because, for live virtual servers 310, the virtual server disk 320 is inherently in a dirty state as such performance maximizing solutions as operating system-level caches and file system journals are often employed to absorb some of the changes made to the devices and flush them at later intervals. In consequence of these solutions, a standard mount method, which expects a clean disk (as in the case of offline VMs) or the ability to flush the disk journal to clean the dirty state, would fail and/or need to perform such a flush process, introducing unwanted changes in the virtual server disk 320.

To achieve reliable processing of live VM virtual disks 320, this invention can employ one or more additional techniques. In an embodiment, a copy-on-write (COW) storage 404 can be created. COW storage 404 can be located inside the monitoring crawler 410, elsewhere in the crawler framework 402 or outside the crawler framework. In any case, COW storage 404 can be used to insure that the information that is acquired includes any changes that have been made, but not propagated to storage 304. To do this, virtual server disk 320 can propagate any changes that virtual server 310 makes to its disk as copies to COW storage 404. With this approach, monitoring crawler 410 can proceed as if it were accessing a writeable medium, while none of the block-level changes to storage 304, such as journal flushes are reflected in the actual target VM disk, but are temporarily transferred to the COW storage 404. When acquiring the set of features, monitoring crawler 410 can acquire features that have changed from COW storage 404 while acquiring features that have not changed from the appropriate VM block via read-only target 406. This approach has another important advantage, by doing this additional COW manipulation, the "real-timeness" of the VM persistent disk state improves dramatically, disk state changes can often be observed even before they are actually synced to the actual virtual server disk 320 file system. Any change made to virtual server disk 320 state can be observed by monitoring crawler 410 substantially immediately (with a possible exception of the additional time spent for the crawl process to complete, which can be on the order of seconds).

An alternative approach to this problem is to employ alternate superblock access, a technique used by disk forensics. Using this solution, the primary superblock of read-only target 406, which maps the disk layout, can be bypassed and the disk can be accessed by way of its alternate superblocks. With alternate superblocks, the virtual server disk 320 with dirty state can be accessed without requiring an initial recovery. The access, however, can yield a slightly incomplete view of the virtual server disk 320 as some of the data or metadata might be stale in the accessed dirty state. This solution is more useful in scenarios where the exact state of the device is more critical, but it is generally more error-prone and implementation dependent across file system distributions.

In any event, once the requisite features have been acquired the components used to acquire these features can be discarded. For example, the association between read-only target 406 and virtual disk can be disengaged and the device mapping via the dm-dup device 432, or the iscsi target 472 can be removed. Copy on write storage 404 and/or read-only target 406 can also be discarded. In addition, crawler framework can often be minimized when not in use.

Referring back to FIG. 1, feature analyzer module 148, as executed by computer system 102, can analyze one or more of the acquired features 154 to perform passive monitoring of virtual server 310 (FIG. 5). Passive monitoring can include such activities as scanning a file system to perform a compliance check, scanning a registry to determine which applications are currently installed on the system, security scanning, file system inspection, license usage monitoring, and the like.

Figure 7:
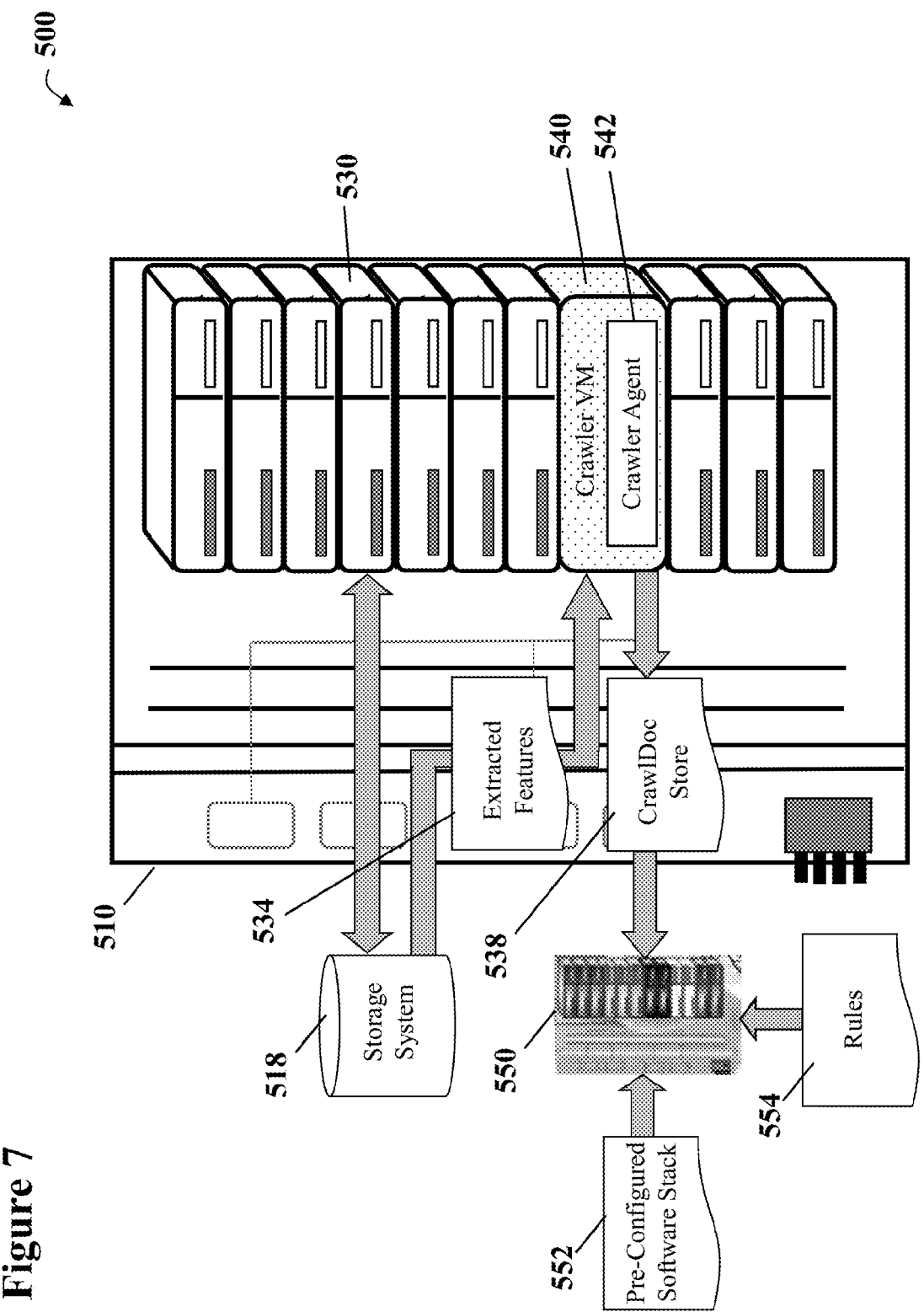
FIG. 7 shows an analysis environment according to embodiments of the invention.

Referring now to FIG. 7, an analysis environment 500 according to an embodiment is illustrated. Analysis environment includes an example physical server 510 having a crawler VM 540 according to embodiments of the invention is shown. As illustrated, crawler VM 540 is separate from virtual servers 530 on physical server 510 in analysis environment 500, and can itself be a virtual server 530. However, as stated previously, other configurations are possible. Crawler VM 540 contains a crawler agent 542 that can acquire extracted features 534 from storage system 518 for each of a plurality of virtual servers 530 in order to perform passive monitoring services for the entire physical server 510. Crawler agent 542 can access the blocks in storage system 518 corresponding to any instance of virtual server 530 via read-only target 406 (FIG. 5) to perform all of the functions that are necessary for passive monitoring. Once the required extracted features 534 have been acquired, these extracted features 534 can be saved in a crawl doc store 538 such as for further processing and/or transmittal to another site for processing. Crawl Doc Store 538, at the very basics, can serve as a data store for the Crawl Docs generated by the feature acquisition module 146 and feature analyzer module 148. Crawl doc store 538 can store this information in various media and formats such as simple file system storage, a relational database, a non-relational database such as a document, key-value, table, graph store and/or the like. From a more general view, the Crawl Doc Store 538 can serve as a full-fledged knowledge base that builds additional logic atop the base data store and performs further document processing to provide a range of query and analytics capabilities for both intra-VM, inter-VM and over-time analysis of the VM state information.

An advantage of this design is that it allows the indexing logic to be offloaded to locations that are physically proximate to where the systems that need to be monitored are actually running, thereby improving its scalability. As an example, say there are 100 physical servers 210, 212, 214, 216 (FIG. 2) in virtualized datacenter environment 200, and each physical server is hosting 25 virtual servers 310 (FIG. 3). By running crawler VM 540 on each physical server 210, 212, 214, 216 (FIG. 2) (i.e., a 26$^{th}$ virtual server 230 on each physical server 210, 212, 214, 216), a single instance of crawler VM 540 can provide indexing services to 25 virtual servers 530 that are co-located with it. As an optimization, the virtual server 530 (FIG. 3) that includes crawler VM 540 can be kept suspended (so that it uses little or no CPU and/or memory resources on physical server 200) when the indexing operation is not running.

Another advantage of this design is that it allows an administrator user 120 (FIG. 1) to perform simple bandwidth optimizations for network 220 (FIG. 2) to lower the volume of data used to communicate extracted features 534 back to central detection server 550. For example, the invention sends those extracted features 334 that changed since that earlier scan to central passive monitoring server 550. This optimization can greatly cut down the amount of data transmitted over network 220 (FIG. 2).

The analysis that is performed can differ based on the type of passive monitoring is being performed. For example, in a drift detection analysis, feature analyzer module 148 can compare one or more elements of extracted features 534 with at least a portion of a corresponding pre-configured software stack 552. By comparing these two, feature analyzer module 148 can compute the difference between the file system structure, contents, state, etc., of each. This difference can consist of, for example, three parts: data that has been added, data that have been deleted, and data that has been modified, all relative to pre-configured software stack 552. In contrast, in a malware type analysis, extracted features 534 can be compared with signatures of known malware agents. In other types on analysis, the extracted features 534 can be analyzed based on a set of rules 554, such as to determine whether certain requirements have been met. Rules 554 can also be inferred statistically by analyzing differences that occur across many virtual servers 530 within a tolerance; can be inferred by automatically classifying files as unvarying (for example, executables), rarely changing (configuration files), or constantly changing (log files); and/or can be inferred from external sources of information such as a description of a cluster's configuration based on an evaluation performed by an evaluation tool. Similar rule-based invariants can be used to detect anomalies or malicious behavior on memory state. Examples of these include, but are not limited to: detecting unknown processes, suspicious network connections, and modifications of code segments.

Figure 8:
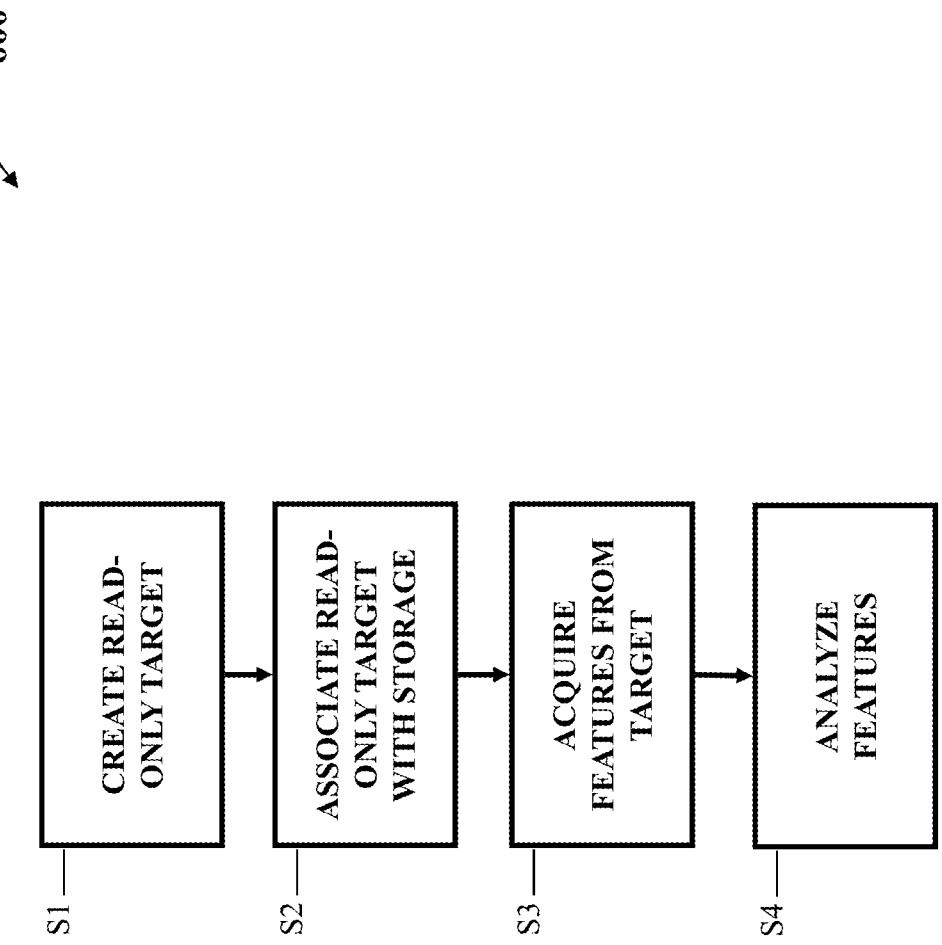
FIG. 8 shows an example flow diagram according to embodiments of the invention.

Turning now to FIG. 8, an example flow diagram according to embodiments of the invention is shown. As illustrated, in 51, read-only device creator module 142 (FIG. 1), as executed by computer system 102 (FIG. 1), creates a read-only target 406 (FIG. 5). This read only-target 406 (FIG. 5) can be created based on a configuration of the virtual server disk 320 (FIG. 5) that the virtual server 310 uses to access its associated storage 304. In S2, virtual disk exposer module 144 (FIG. 1), as executed by computer system 102 (FIG. 1), associates read only-target 406 (FIG. 5) with virtual server disk 320. In S3, feature acquisition module 146 (FIG. 1), as executed by computer system 102 (FIG. 1), acquires a set of features 154 regarding virtual server 310 (FIG. 5) from virtual server disk 320 (FIG. 4). This acquisition can be performed by a monitoring crawler 410 (FIG. 5) using read only-target 406 (FIG. 5). In S4, feature analyzer module 148 (FIG. 1), as executed by computer system 102 (FIG. 1), analyzes acquired features 154 (FIG. 1) to perform passive monitoring of virtual server 330 (FIG. 5).

While shown and described herein as a method and system for passively monitoring a computer system, it is understood that aspects of the invention further provide various alternative embodiments. For example, in one embodiment, the invention provides a computer program fixed in at least one computer-readable medium, which when executed, enables a computer system to passively monitor a computer system. To this extent, the computer-readable medium includes program code, such as passive monitoring program 140 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code, such as passive monitoring program 140 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for passively monitoring a computer system. In this case, a computer system, such as computer system 120 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The terms "first," "second," and the like, if and where used herein do not denote any order, quantity, or importance, but rather are used to distinguish one element from another, and the terms "a" and "an" herein do not denote a limitation of quantity, but rather denote the presence of at least one of the referenced item. The modifier "approximately", where used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to approximately 25 wt %, or, more specifically, approximately 5 wt % to approximately 20 wt %", is inclusive of the endpoints and all intermediate values of the ranges of "approximately 5 wt % to approximately 25 wt %," etc).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for passively monitoring a virtual server, comprising:
    creating a read-only target based on a configuration of a virtual server disk associated with a virtual server;
    exposing the virtual server disk to be accessed by a monitoring crawler;
    wrapping an image file of the virtual server in a linear block device defined by a device mapper table for the virtual server disk,
    wherein the exposing includes copying the device mapper table to the read-only target;
    disassociating, prior to the exposing, the read-only target from a different virtual server disk associated with a different virtual server, the different virtual server disk having been previously accessed by the monitoring crawler via the read-only target,
    wherein the disassociating includes copying the device mapper table associated with the virtual server over a different device mapper table associated with the different virtual server in the read-only target without removing information common to the virtual server and the different virtual server;
    acquiring, by the monitoring crawler, a set of features regarding the virtual server from the virtual server disk via the read-only target; and
    analyzing at least one of the set of features to perform passive monitoring of the virtual server.

2. The method of claim 1, further comprising:
    identifying device configurations of the virtual server using a hypervisor-based virtualization management utility; and
    determining the configuration of the virtual server disk based on the identifying.

3. The method of claim 1, wherein the monitoring crawler is included in a crawler virtual server that is different from the virtual server being monitored and that is located on a common physical server with the virtual server.

4. The method of claim 1,
    wherein the read-only target is a read-only Internet Small Computer System Interface (ISCSI) target for a virtual server disk of the virtual server,
    wherein the monitoring crawler is located on a physical server that is remote from the common physical server containing the virtual server, and
    wherein the exposing includes presenting the read-only ISCSI target over a network as the read-only target.

5. The method of claim 1, further comprising:
    receiving, prior to the retrieving, a request from a central detection server at an indexing appliance, the request requesting the monitoring crawler to perform passive monitoring on the virtual server;
    forwarding data corresponding to the set of features from the monitoring crawler to the central detection server; and
    performing the analyzing at the central detection server.

6. The method of claim 1, further comprising:
    creating, in response to a request, a copy-on-write storage;
    copying, for every write to a data block, data being written via the write to the copy-on-write storage,
    wherein the acquiring includes accessing the data block to get data that has not been written and accessing the copy-on-write storage to get data that has been written.

7. A system for passively monitoring a computer system, comprising at least one computer device that performs a method, comprising:
    creating a read-only target based on a configuration of a virtual server disk associated with a virtual server;
    exposing the virtual server disk to be accessed by a monitoring crawler;
    wrapping an image file of the virtual server in a linear block device defined by a device mapper table for the virtual server disk,
    wherein the exposing includes copying the device mapper table to the read-only target;
    disassociating, prior to the exposing, the read-only target from a different virtual server disk associated with a different virtual server, the different virtual server disk having been previously accessed by the monitoring crawler via the read-only target,
    wherein the disassociating includes copying the device mapper table associated with the virtual server over a different device mapper table associated with the different virtual server in the read-only target without removing information common to the virtual server and the different virtual server;
    acquiring, by the monitoring crawler, a set of features regarding the virtual server from the virtual server disk via the read-only target; and
    analyzing at least one of the set of features to perform passive monitoring of the virtual server.

8. The system of claim 7, the method further comprising:
    identifying device configurations of the virtual server using a hypervisor-based virtualization management utility; and
    determining the configuration of the virtual server disk based on the identifying.

9. The system of claim 7, wherein the monitoring crawler is included in a crawler virtual server that is different from the virtual server being monitored and that is located on a common physical server with the virtual server.

10. The system of claim 7,
    wherein the read-only target is a read-only Internet Small Computer System Interface (ISCSI) target for a virtual server disk of the virtual server,
    wherein the monitoring crawler is located on a physical server that is remote from the common physical server containing the virtual server, and
    wherein the exposing includes presenting the read-only ISCSI target over a network as the read-only target.

11. The system of claim 7, the method further comprising:
    receiving, prior to the retrieving, a request from a central detection server at an indexing appliance, the request requesting the monitoring crawler to perform passive monitoring on the virtual server;
    forwarding data corresponding to the set of features from the monitoring crawler to the central detection server; and
    performing the analyzing at the central detection server.

12. The system of claim 7, the method further comprising:
creating, in response to a request, a copy-on-write storage;
copying, for every write to a data block, data being written via the write to the copy-on-write storage,
wherein the acquiring includes accessing the data block to get data that has not been written and accessing the copy-on-write storage to get data that has been written.

13. A computer program product embodied in a non-transitory computer readable medium for implementing a method for passively monitoring a computer system, the method comprising:
creating a read-only target based on a configuration of a virtual server disk associated with a virtual server;
exposing the virtual server disk to be accessed by a monitoring crawler;
wrapping an image file of the virtual server in a linear block device defined by a device mapper table for the virtual server disk,
wherein the exposing includes copying the device mapper table to the read-only target;
disassociating, prior to the exposing, the read-only target from a different virtual server disk associated with a different virtual server, the different virtual server disk having been previously accessed by the monitoring crawler via the read-only target,
wherein the disassociating includes copying the device mapper table associated with the virtual server over a different device mapper table associated with the different virtual server in the read-only target without removing information common to the virtual server and the different virtual server;
acquiring, by the monitoring crawler, a set of features regarding the virtual server from the virtual server disk via the read-only target; and
analyzing at least one of the set of features to perform passive monitoring of the virtual server.

14. The program product of claim 13, the method further comprising:
identifying device configurations of the virtual server using a hypervisor-based virtualization management utility; and
determining the configuration of the virtual server disk based on the identifying.

15. The program product of claim 13, wherein the monitoring crawler is included in a crawler virtual server that is different from the virtual server being monitored and that is located on a common physical server with the virtual server.

16. The program product of claim 13,
wherein the read-only target is a read-only Internet Small Computer System Interface (ISCSI) target for a virtual server disk of the virtual server,
wherein the monitoring crawler is located on a physical server that is remote from the common physical server containing the virtual server, and
wherein the exposing includes presenting the read-only ISCSI target over a network as the read-only target.

17. The program product of claim 13, the method further comprising:
receiving, prior to the retrieving, a request from a central detection server at an indexing appliance, the request requesting the monitoring crawler to perform passive monitoring on the virtual server;
forwarding data corresponding to the set of features from the monitoring crawler to the central detection server; and
performing the analyzing at the central detection server.

18. The program product of claim 13, the method further comprising:
creating, in response to a request, a copy-on-write storage;
copying, for every write to a data block, data being written via the write to the copy-on-write storage,
wherein the acquiring includes accessing the data block to get data that has not been written and accessing the copy-on-write storage to get data that has been written.

19. A method for deploying an application on a computer infrastructure for passively monitoring a computer system, comprising:
creating a read-only target based on a configuration of a virtual server disk associated with a virtual server;
exposing the virtual server disk to be accessed by a monitoring crawler;
wrapping an image file of the virtual server in a linear clock device defined by a device mapper table for the virtual server disk,
wherein the exposing includes copying the device mapper table to the read-only target;
disassociating, prior to the exposing, the read-only target from a different virtual server disk associated with a different virtual server, the different virtual server disk having been previously accessed by the monitoring crawler via the read-only target,
wherein the disassociating includes copying the device mapper table associated with the virtual server over a different device mapper table associated with the different virtual server in the read-only target without removing information common to the virtual server and the different virtual server;
acquiring, by the monitoring crawler, a set of features regarding the virtual server from the virtual server disk via the read-only target; and
analyzing at least one of the set of features to perform passive monitoring of the virtual server.

* * * * *